June 3, 1947.  R. C. PORTER  2,421,713
THERMOSTATIC ORIFICE CONTROL
Filed Sept. 30, 1942  2 Sheets-Sheet 1
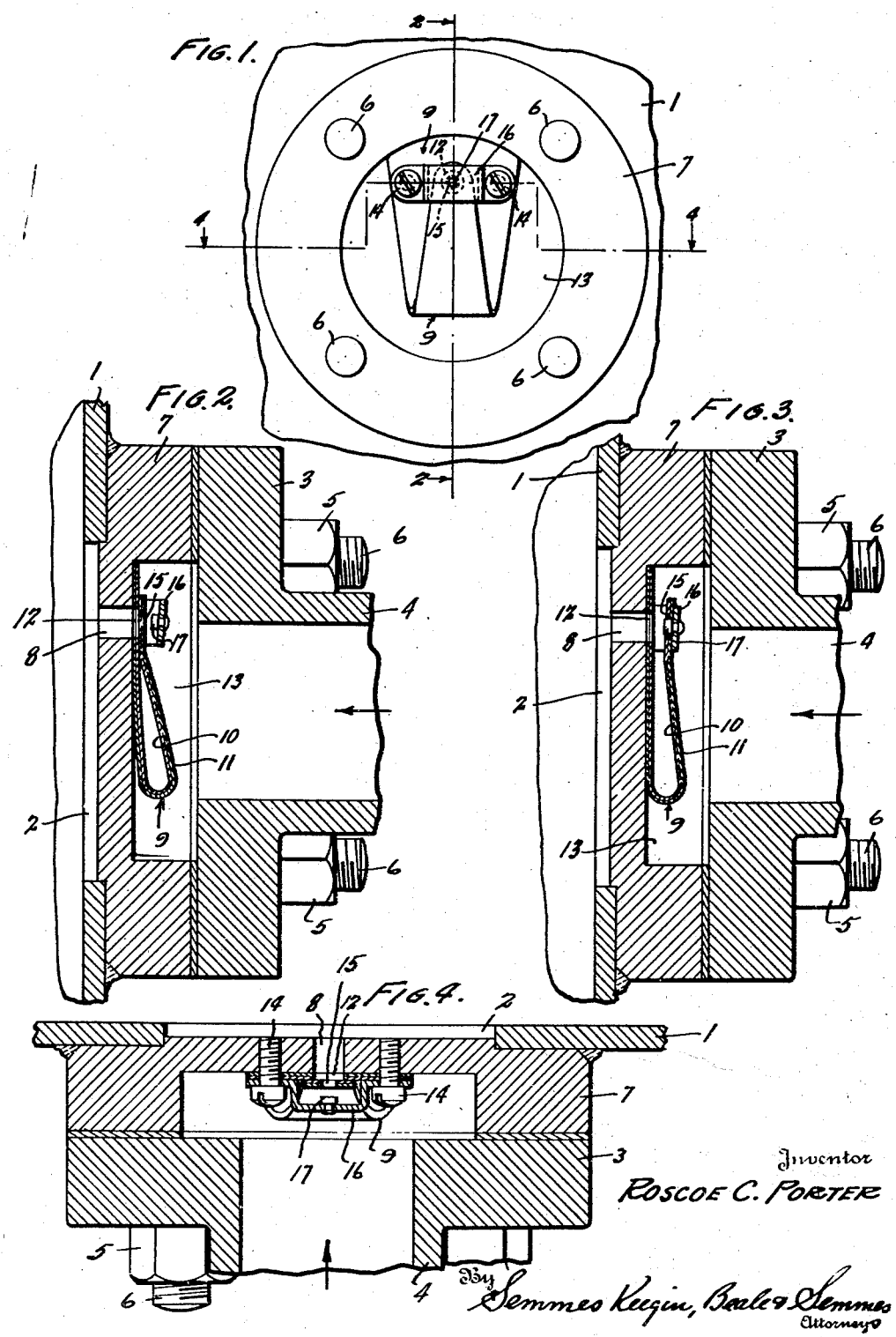
Inventor
ROSCOE C. PORTER
By Semmes Keegin, Bazle & Semmes
Attorneys

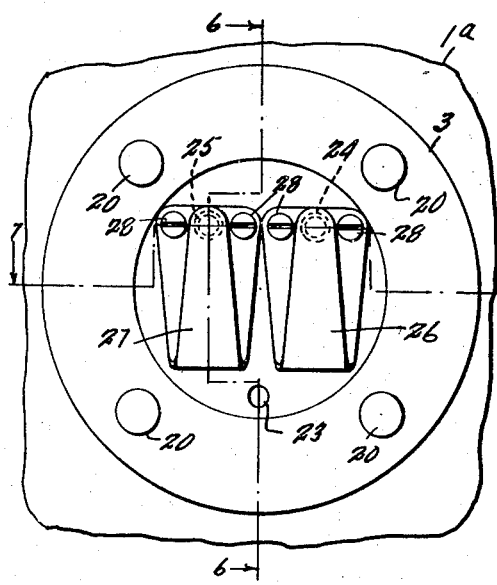
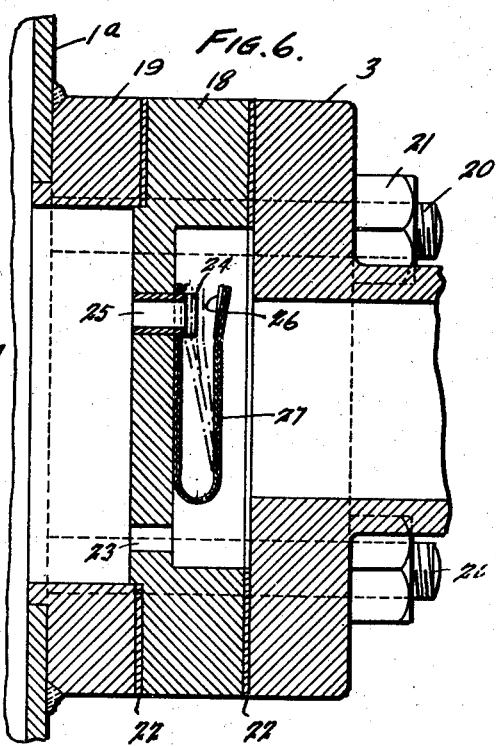
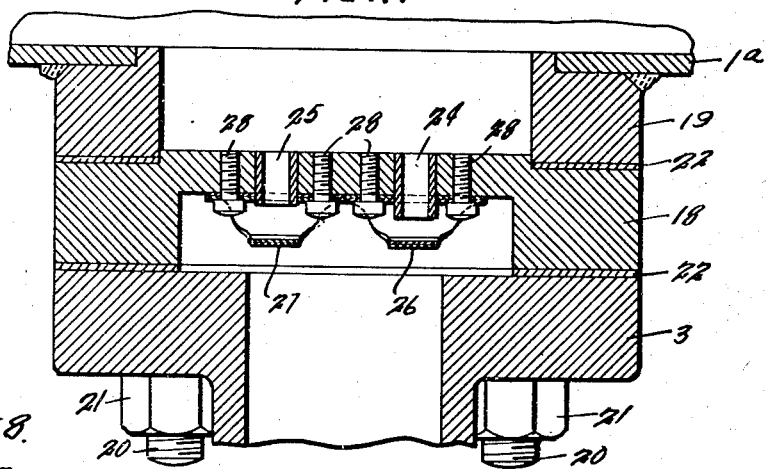
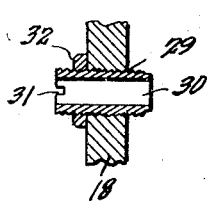

Patented June 3, 1947

2,421,713

UNITED STATES PATENT OFFICE 2,421,713

THERMOSTATIC ORIFICE CONTROL

Roscoe C. Porter, Arlington, Va., assignor, by mesne assignments, to The Briggs Filtration Company, Bethesda, Md., a corporation of Maryland Application September 30, 1942, Serial No. 460,261

4 Claims. (Cl. 138—46)

This invention relates to flow control devices and more particularly relates to such a device for regulating the flow of a fluid into a clarifier under varying temperature conditions.

In the use of clarifiers for the clarification of lubricating oil, varying temperature conditions are encountered in which the oil to be clarified may be rather viscous and in which the same oil under other temperature conditions may be extremely fluid. In most installations, the oil is fed under pressure through the inlet opening of a clarifying apparatus and obviously if the oil is at a low temperature and its viscosity is greatly increased, the rate of flow through the clarifying apparatus will be considerably slower than is the case if the oil were at a higher temperature and its viscosity very low. Obviously, if a clarifier is constructed to handle a given quantity of oil at an ordinary temperature, it will be quite impossible for the same filter to handle the same quantity of oil at low temperatures at which the viscosity of the oil is high.

An object of the present invention is to provide a flow control device for regulating the flow of a fluid to be filtered into a clarifying apparatus.

Another object of this invention is to provide a temperature responsive orifice control device for restricting said orifice when the temperature of the fluid flowing therethrough is sufficiently high to materially reduce the viscosity of the fluid.

A further object of this invention is to provide a thermostatic flow control device which will insure a satisfactory flow of fluid through a clarifying device at different temperatures.

Yet another object of this invention is to provide a flow control device in a lubricating system for regulating the flow of fluid from the system into a clarifying apparatus and to prevent too much drainage from the engine lubricating system.

Still another object of this invention is to provide a thermostatic flow control device which comprises a bi-metallic strip having an opening in one end, which end is adapted to be displaced to and from a position to cover an orifice, the flow through which is to be controlled.

A still further object of this invention is to provide a thermostatic flow control device which comprises a bi-metallic strip having an opening in one end, which end is adapted to be thermally displaced to and from a position to cover an orifice, and means positioned for entering the opening at the end of the bi-metallic strip when thermally displaced to a position remote from the orifice to automatically remove foreign matter from said opening.

With these and other objects in view which will appear more fully hereinafter, the invention resides in the parts and combinations illustrated in the accompanying drawings and described in the following specification.

In order to more fully illustrate the present invention, reference is made to the accompanying drawings in which:

Figure 1 is a fragmentary elevational view of a clarifying apparatus having a thermostatic control device associated with the inlet thereof.

Figure 2 is a sectional view taken on line 2—2 of Figure 1.

Figure 3 is a view similar to that of Figure 2, but illustrating the thermostatic control device in open position.

Figure 4 is a fragmentary sectional view taken on line 4—4 of Figure 1.

Figure 5 is a fragmentary elevational view similar to Figure 1 illustrating a modified form of the invention.

Figure 6 is a sectional view taken on line 6—6 of Figure 5.

Figure 7 is a sectional view on line 7—7 of Figure 5.

Figure 8 is a fragmentary sectional view showing in detail a replaceable nozzle mounted in an orifice.

Apparatus for clarifying oil to which the present invention relates usually comprises a casing in which the clarifying elements are mounted and into which casing the fluid to be clarified is introduced. In the drawings the casing of the clarifying apparatus has been indicated by reference character 1 and this casing is provided with a flow inlet 2. In some installations, a pipe flange such as indicated by reference character 3 and which has a pipe connecting portion 4 is secured directly to the casing 1 about the inlet opening 2 by nuts 5 mounted on the studs 6. It is often desired to restrict the flow of the fluid to be clarified through the inlet opening 2 and for this purpose a flow restricting device is interposed between the portion of the casing 1 surrounding the inlet opening 2 and the pipe flange 3. Such a flow restricting device has been indicated by reference character 7 in the drawings and, as illustrated, is provided with an orifice 8.

The advantage of the use of the flow restricting device is particularly great when a battery of clarifiers are fed from a manifold or header, the restricting devices serving to more evenly distribute the fluid to be clarified to the several individual clarifiers of the battery.

It has been found that if the orifices 8 are made of such a cross section to permit the proper quantity of fluid to flow therethrough when the fluid is at a normal operating temperature then when the fluid is at a lower temperature and its viscosity has considerably increased, the rate of flow through the orifice 8 will not be sufficient. This is particularly troublesome in the case in which the clarifier is used for clarifying the lubricating oil of an internal combustion engine and in which the orifice is of a size to permit the proper flow of oil when the latter is at the operating temperature of the engine. In this instance, when the engine has been idle for some time and the lubricating oil is at atmospheric temperature, it will be found that the viscosity of the oil has increased to such an extent that the flow through the orifice 8 will not be sufficient for satisfactory clarification. This condition will exist until the temperature of the oil has been raised by an increase in the engine temperature to a value approaching that of normal operating temperature.

For overcoming this disadvantage, the present invention contemplates forming the orifice 8 of a size sufficient to pass an adequate quantity of oil through the clarifier at low temperatures when the viscosity of the oil is high. Under these conditions, if the oil is heated up and its viscosity is decreased, the rate of flow of oil through the clarifier will be such as to reduce the efficiency of clarification and in some cases reduce the engine's oil pressure to a dangerous level. Therefore, the present invention provides a thermostatically controlled element which is automatically placed over the orifice 8 to restrict said orifice and thereby obtain substantially the same rate of flow therethrough when the oil is heated, as takes place when the oil is cold and viscous.

It has been found that one form of device particularly suitable for this purpose comprises a bi-metallic strip 9 formed of two metals 10 and 11 having different coefficients of expansion. One end of the strip 9 is comparatively wide and is provided with an aperture 12 of a diameter substantially equal to that of the orifice 8. The strip 9 is mounted within a recess 13 of the flow restricting device 7 and is secured to the wall thereof containing the orifice 8 by means of screws 14.

It will be noted that the aperture 12 is in register with the orifice 8 so as to avoid any restriction thereof. In some instances it may be found advantageous to employ a bi-metallic strip 9 having an aperture 12 therein of a size less than that of the orifice 8. This will be true in the case in which the orifice 8 is of a diameter larger than that which is required for the particular fluid being controlled. The strip 9 as illustrated in the drawings tapers from the end which is fixedly mounted to the flow restricting device 7 toward the free end thereof and in addition is bent into substantially U-shape as is best illustrated in Figures 2 and 3. It will be observed that the free end of the strip 9 extends to a position to lie over the orifice 8 and said free end is provided with an aperture 15 which is calibrated to a size which will permit a flow of fluid therethrough at a high temperature corresponding to the flow which will pass through the orifice 8 at a low temperature.

Strip 9 has the two metals therein so positioned that when the strip is at a temperature corresponding to that of the cooled fluid, the end of the strip containing the opening 15 will be displaced away from the orifice 8, as illustrated in Figure 3. When in this position the cool fluid may pass through the orifice 8 in a substantially unrestricted manner. On the other hand, when the temperature of the fluid to be clarified is raised to a value at which the proper flow may pass through the small opening 15, the end of the strip containing said opening 15 will be displaced to a position such as illustrated in Figure 2 in which the orifice 8 will be covered by the free end of the strip 9 and the flow through said orifice 8 will be reduced to that which passes through the small opening 15.

In clarifiers for clarification of the lubricating oil of small internal combustion engines, the size of the small opening 15 is such that there is a tendency for the same to become clogged when there is no flow therethrough. To overcome this disadvantage, the present invention provides means for entering into the small opening 15 and removing any sediment therefrom and preventing the settling of any particles of material therein when there is no flow through said opening. As illustrated in the drawings, the screws 14 in addition to mounting the wide end of the strip 9 within the recess 13 also serves to mount a bridge or support member 16 within said recess. The bridge or support member 16 is provided with a pin or lug 17 which extends inwardly toward the orifice 8 and is so positioned that when the free end of the strip 9 is displaced away from the orifice 8, the small opening 15 in the free end of the strip will receive the pin 17. With this construction the small opening 15 will not become clogged with sediment and the size of said opening will remain substantially constant at all times so that there will be no tendency for a reduced or inadequate flow of lubricating oil through the clarifier when the latter is at the normal operating temperature of the engine.

The present invention also contemplates the provision of a flow control device having a plurality of orifices which may be closed or opened in sequence. As shown in Figs. 5 to 8 of the drawings, a flow control device in the form of a plate or flange 18 is secured between an attaching flange 19 on a casing 1a of a clarifier and the pipe flange 3. The several flanges may be secured together by means of bolts or studs 20 on which are threadedly mounted nuts 21. Suitable gaskets 22 may be interposed between the plate 18 and the flanges 3 and 19.

As is best illustrated in Figs. 5 and 6, the flow restricting plate 18 is provided with three orifices 23, 24 and 25. Each of the orifices 24 and 25 is equipped with a thermostatically actuated closure in the form of bi-metal strips 26 and 27 respectively. The bi-metal strips are constructed substantially identically to the strips 9 shown in Figs. 1 to 4 and may be mounted by means of studs or screws 28 passing through openings provided in the wide end thereof and threaded in the plate 18.

The free ends of the bi-metal strips 26 and 27 may be provided with openings so as to merely restrict the flow through the orifices 24 and 25 with which said strips are associated, or said free ends of the strips may be imperforate so as to completely close the orifices. In the event that openings are provided in the free ends of the bi-metal strips, means such as the pins 17 shown in Figs. 1 to 4 may be provided for entering into said openings when the strips are in an inoperative position to clean out said opening.

With the construction illustrated in Figs. 5 to 8, the flow control device in the form of the plate having the three orifices therein may be equipped with bi-metal strips capable of operating at different temperatures so that when the liquid flowing through the orifices reaches a predetermined temperature, first one bi-metal strip will be affected to close or restrict the orifice with which it is associated and as the temperature increases still further, the other bi-metal strip will be actuated to close the orifice with which it is associated. This will leave the single orifice open for the flow of liquid therethrough at the highest operating temperature.

Instead of providing a plate having three orifices, two of which are equipped with bi-metal control strips, it is also within the concept of the present invention to provide any desired number of orifices in the flow control plate and to equip as many of said orifices as is desired with bi-metal strips operable at various temperatures for controlling the flow of liquid through said orifices.

As is more clearly illustrated in Fig. 8 of the drawings, the orifices, particularly those which are controlled by the bi-metal strips, may be internally threaded to receive nozzles 29 provided with a bore 30 of predetermined cross section. This construction enables the size of the orifice to be changed by replacing the nozzle with other nozzles having bores of different cross sections. The provision of the replaceable nozzles 29 also permits an adjustment of the end of the nozzle which is closed or restricted by the bi-metal strip so that said end of the nozzle may be moved toward or away from the bi-metal strip and thereby effect the closing and opening of the bore in the nozzle at different temperatures. For this purpose the other end of the nozzle may be provided with a slot 31 and a lock nut 32 may be threadedly mounted on the outer portion of said nozzle to secure the latter in adjusted positions.

While in Figs. 1 to 4 the flow control device 7 has been shown welded directly onto the casing 1 of the clarifier and in Figs. 5 to 7 the flow control device 18 has been shown interposed between the flange 19 carried by the casing 1a and the pipe flange 3, it should be understood that either form of mounting of the flow control device may be employed. Also in either form of construction, the free movable ends of the bi-metal strips may be perforate or imperforate. In addition, in both forms of the invention the orifices may be provided with the adjustable and replaceable nozzles.

The device of the present invention, while being fairly simple in construction, is completely adequate for accomplishing the result sought and has proven to be very practical.

I claim:

1. A temperature responsive orifice control comprising a bi-metallic strip having an opening in a portion thereof, said portion being displaceable upon deformation of the strip in response to temperature changes to and from positions to cover the orifice, and means positioned to enter and remove particles from the opening when the portion of the strip containing the same is moved away from said orifice.

2. A flow control device for clarifiers comprising a fitting having an orifice therein, a bi-metal strip having an opening in one portion thereof and mounted for movement to and from a position to cover said orifice, and means mounted to enter said opening when the portion of the strip containing the same is moved away from the position of covering said orifice.

3. A flow control device comprising a member having an orifice therein, a bi-metal strip having a large opening in one end thereof, means for fixing said end of the strip to the member with the opening in register with the orifice, said strip being of substantially U-shape, the other end of said strip being free and having a restricting opening therein and lying opposite and in register with the large opening and the orifice, the expansion coefficients of the metals forming said strip being such that the strip will be deformed to move the free end of the strip to a position to place the restricting opening over the orifice at one temperature and to uncover the orifice at another temperature, a support carried by said member, and means on said support to enter the restricting opening when the free end of the strip is displaced away from the orifice.

4. A flow control device comprising a member having an orifice therein, a bi-metal strip having a large opening in one end thereof, means for fixing said end of the strip to the member with the opening in register with the orifice, said strip being of substantially U-shape, the other end of said strip being free and having a restricting opening therein and lying opposite and in register with the large opening and the orifice, the expansion coefficients of the metals forming said strip being such that the strip will be deformed to move the free end of the strip to a position to place the restricting opening over the orifice at one temperature and to uncover the orifice at another temperature, a support carried by said member, means on said support to enter the restricting opening when the free end of the strip is displaced away from the orifice, and means for securing the support and fixed end of the strip to said member.

ROSCOE C. PORTER.

REFERENCES CITED

The following references are of record in the file of this patent:

UNITED STATES PATENTS

| Number | Name | Date |
|---|---|---|
| 1,888,225 | Hetherington | Nov. 22, 1932 |
| 1,968,553 | Heitger | July 31, 1934 |
| 2,008,835 | Rawcliffe | July 23, 1935 |
| 857,452 | Farmer | June 18, 1907 |
| 1,206,625 | Vetter | Nov. 28, 1916 |
| 2,184,607 | Swanson | Dec. 26, 1939 |
| 2,257,972 | McCollum | Oct. 7, 1941 |
| 1,768,558 | Andrews | July 1, 1930 |
| 1,964,638 | Kreidel | June 26, 1934 |
| 1,972,907 | Shaw | Sept. 11, 1934 |